US012137749B2

(12) United States Patent
Li et al.

(10) Patent No.: US 12,137,749 B2
(45) Date of Patent: Nov. 12, 2024

(54) TEMPERATURE CONTROL METHOD, AEROSOL GENERATION APPARATUS AND AEROSOL GENERATION SYSTEM

(71) Applicant: SHANGHAI NEW TOBACCO PRODUCT RESEARCH INSTITUTE CO., LTD., Shanghai (CN)

(72) Inventors: Xianglin Li, Shanghai (CN); Bin Nie, Shanghai (CN); Wenjie Lu, Shanghai (CN); Jianghong Qu, Shanghai (CN)

(73) Assignee: SHANGHAI NEW TOBACCO PRODUCT RESEARCH INSTITUTE CO., LTD., Shanghai (CN)

( * ) Notice: Subject to any disclaimer, the term of this patent is extended or adjusted under 35 U.S.C. 154(b) by 393 days.

(21) Appl. No.: 17/625,337

(22) PCT Filed: Jul. 7, 2020

(86) PCT No.: PCT/CN2020/100610
§ 371 (c)(1),
(2) Date: Jan. 7, 2022

(87) PCT Pub. No.: WO2021/008406
PCT Pub. Date: Jan. 21, 2021

(65) Prior Publication Data

US 2022/0248769 A1 Aug. 11, 2022

(30) Foreign Application Priority Data

Jul. 15, 2019 (CN) ......................... 201910635439.4

(51) Int. Cl.
*B01F 23/21* (2022.01)
*A24F 40/53* (2020.01)
(Continued)

(52) U.S. Cl.
CPC .............. *A24F 40/57* (2020.01); *A24F 40/53* (2020.01); *B01F 23/213* (2022.01); *B01F 23/2133* (2022.01)

(58) Field of Classification Search
CPC ..... B01F 23/213; B01F 23/2133; A24F 40/57
See application file for complete search history.

(56) References Cited

U.S. PATENT DOCUMENTS 10,143,232 B2 * 12/2018 Talon .................. H05B 1/0244

FOREIGN PATENT DOCUMENTS

CN 104470386 A 3/2015
CN 107095343 A 8/2017
(Continued)

OTHER PUBLICATIONS

International Search Report, dated Oct. 12, 2020 in corresponding International Application No. PCT/CN2020/100610.
(Continued)

*Primary Examiner* — Robert A Hopkins
(74) *Attorney, Agent, or Firm* — Amster, Rothstein & Ebenstein LLP

(57) ABSTRACT

A method for controlling temperature of a heating element in an electronic inhaler for vaporizing an aerosol forming substrate. The method includes, in a first stage, applying power to and increasing a temperature of the heating element from an initial temperature to a first temperature; in a second stage, controlling power to decrease the temperature of the heating element from the first temperature to a second temperature; and in a third stage, controlling the heating element to provide a constant temperature operation at the second temperature. During detection of inhalation, power to the heating element is increased to raise its temperature to a third temperature. In the third stage, the heating element increases the temperature only when suction is detected,
(Continued)

thereby ensuring that a supply of an aerosol to the inhaler and minimize waste of electric energy and the aerosol forming substrate.

15 Claims, 4 Drawing Sheets

(51) Int. Cl.
*A24F 40/57* (2020.01)
*B01F 23/213* (2022.01)

(56) References Cited

FOREIGN PATENT DOCUMENTS

| | | | |
|---|---|---|---|
| CN | 107296301 | A | 10/2017 |
| CN | 107692316 | A | 2/2018 |
| CN | 108618207 | A | 10/2018 |
| CN | 108652089 | A | 10/2018 |
| CN | 109043665 | A | 12/2018 |
| CN | 110367593 | A | 10/2019 |
| JP | 2015-507477 | A | 3/2015 |
| WO | 2019068821 | A1 | 4/2019 |

OTHER PUBLICATIONS

Office Action dated Jan. 28, 2021, in corresponding CN application No. 201910635439.4.

* cited by examiner

TEMPERATURE CONTROL METHOD, AEROSOL GENERATION APPARATUS AND AEROSOL GENERATION SYSTEM

CROSS REFERENCE TO RELATED APPLICATIONS

This application is a national phase of PCT application No. PCT/CN2020/100610, filed Jul. 7, 2020, which claims priority to Chinese patent application No. 201910635439.4, filed on Jul. 15, 2019, all of which are incorporated herein by reference thereto.

TECHNICAL FIELD

The present invention relates to the technical field of aerosol generation, in particular to a temperature control method, an aerosol generation apparatus and an aerosol generation system.

BACKGROUND

In recent years, with the increasing attention to health, people have realized that smoking traditional cigarettes has a certain harm to health. The impact of traditional cigarettes on health and environment has gradually attracted the attention of countries all over the world. Tobacco manufacturers are committed to providing consumers with tobacco products with lower harm. In recent years, heat-not-burn tobacco products, as a new form of tobacco consumption, are gradually welcomed by the market and are increasingly accepted by cigarette consumers in most countries.

At present, a heating control process of a heating body for heat-not-burn tobacco appliances on the market is relatively single. A designer generally employs a same temperature curve control mode, regardless of whether a consumer inserts atomized cigarettes and a suction action, which is likely to cause waste and dry burn. In addition, the temperature curve of these heat-not-burn tobacco appliances is also not separately designed according to a suction action of a consumer and the atomizer tobacco matched therewith, which makes the suction experience of the consumer reduced.

Therefore, how to provide a temperature control method with better suction experience has become an urgent technical problem to be solved in the art.

SUMMARY

The technical problem to be solved by the present invention is how to provide a temperature control method with better suction experience.

In order to solve the above problem, the present invention provides a temperature control method, applied to an aerosol generation apparatus, wherein the aerosol generation apparatus includes a detection element and a heating element for heating an aerosol generation base material, and the temperature control method includes:

- in a first stage, controlling the heating element to increase the temperature from an initial temperature to a first temperature;
- in a second stage, controlling the heating element to decrease the temperature from the first temperature to a second temperature; and
- in a third stage, controlling the heating element to perform constant temperature operation at the second temperature, and if the detection element detects suction, controlling the heating element to increase the temperature to a third temperature.

Further, in the third stage, if the detection element detects the suction within a first preset duration, the heating element is controlled to keep the second temperature constant for the first preset duration, and then the heating element is controlled to increase the temperature to the third temperature.

Further, if the detection element does not detect the suction within the first preset duration, the heating element is controlled to operate continuously at the second temperature until the end of the third stage.

Further, the first preset duration is equal to a duration from the start of the third stage to the time when the amount of aerosol generated by the aerosol generation base material at the second temperature begins to be insufficient.

Further, the third stage is divided into a number of processes, a preset duration, preset suction times, and a preset temperature are independently set in each process, in any one process, the heating element is controlled to perform constant temperature operation at a preset temperature of the process, and when the preset suction times of the process is detected within a preset duration of the process, the process is ended, the temperature is increased, and a next process is entered.

Further, in the third stage, the difference between the preset temperatures of two adjacent processes is less than or equal to 15° C.

Further, in the third stage, the preset suction times in the later process is less than or equal to the preset suction times in the previous process.

Further, in the third stage, in any one process, if the detected suction times is less than the preset suction times of the process within the preset duration of the process, the heating element is controlled to perform constant temperature operation at the preset temperature of the process until the end of the third stage.

Further, the third stage is ended when a predetermined total number of suction times is detected.

Further, the first temperature, the second temperature and the third temperature are higher than the temperature at which the aerosol generation base material generates aerosol, and lower than the temperature at which the aerosol generation base material is burned.

Further, the first temperature and/or the third temperature is 200-500° C. and/or the second temperature is 180-350° C.

Further, the present invention provides an aerosol generation apparatus, including a control element, a detection element and a heating element for heating an aerosol generation base material, wherein the control element is configured to control the energy supply of the heating element and realize the temperature control method described above.

Further, the detection element is a temperature detection element, and is configured to detect the temperature of the heating element and determine whether a suction action occurs through the temperature change of the heating element;

or the detection element is an air flow detection element, and is configured to determine whether a suction action occurs through the air flow.

Further, the present invention provides an aerosol generation system, including the aforementioned aerosol generation apparatus and an aerosol generation base material.

To sum up, temperature change of the heating element is controlled according to a suction action of a consumer in the invention. In the third stage, the heating element increases the temperature only when suction is detected, thereby ensuring that the supply of an aerosol always meets the requirement when the consumer sucks, and avoiding waste of electric energy and the aerosol generation base material. A more intelligent temperature control method is provided, and the suction experience of the consumer is improved.

BRIEF DESCRIPTION OF THE DRAWINGS

The present invention is further described in detail below in combination with the accompanying drawings and detailed description.

DETAILED DESCRIPTION

Figure 1:
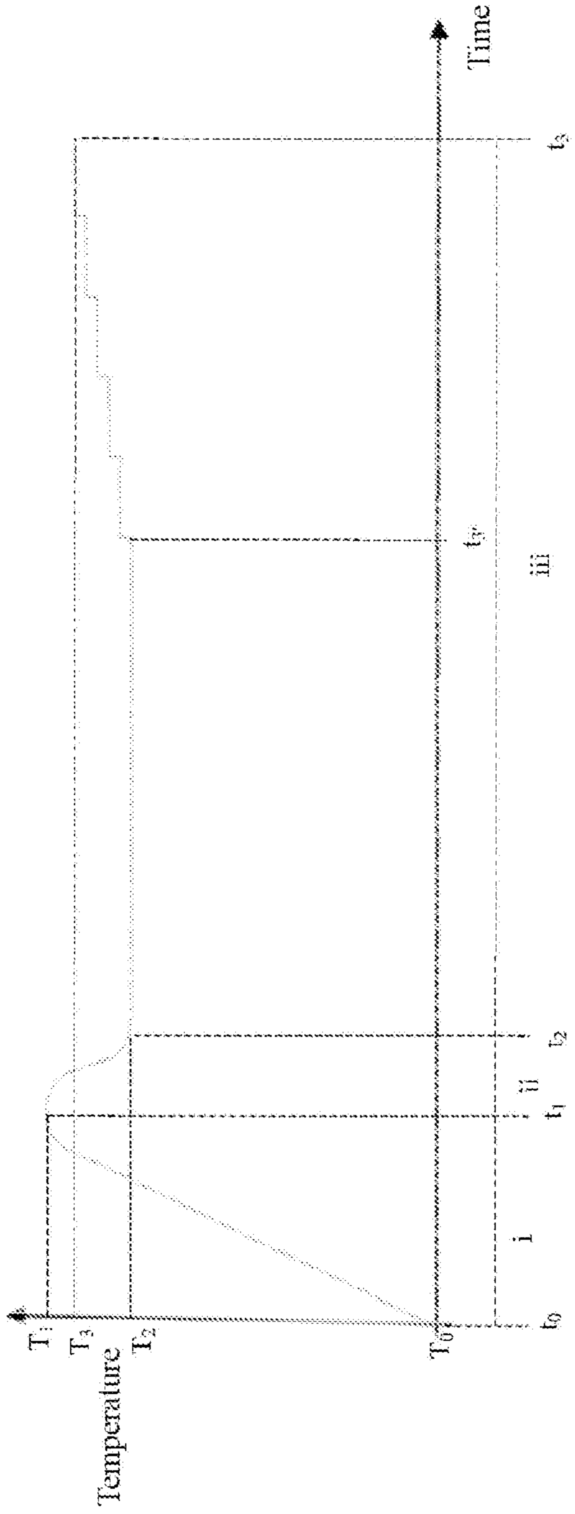
FIG. 1 is a temperature control curve of one preferred embodiment provided by the present invention.

The implementation modes of the present invention are described below by specific embodiments, and those skilled in the art can easily understand other advantages and effects of the present invention from the contents disclosed in the specification. Although the description of the present invention will be introduced in connection with the preferred embodiments, this does not mean that the features of this invention are limited to the embodiments only. On the contrary, the purpose of introducing the invention in combination with the embodiments is to cover other options or modifications that may be derived based on the claims of the invention. Numerous specific details will be included in the following description in order to provide a thorough understanding of the invention. The invention may also be implemented without using these details. Furthermore, some specific details will be omitted in the description in order to avoid confusing or obscuring the focus of the invention. It should be noted that embodiments and features of embodiments of the invention may be combined with each other without conflict.

It should be noted that in this specification, similar reference signs and letters represent similar items in the following drawings, and therefore, once a certain item is defined in one drawing, it does not need to be further defined and explained in subsequent drawings.

In order to make the objects, technical solutions and advantages of the present invention more clear, the embodiments of the present invention will be further described in detail below in combination with the accompanying drawings.

As shown in FIGS. 1-4, the present invention provides a temperature control method applied to an aerosol generation apparatus, wherein the aerosol generation apparatus includes a detection element and a heating element for heating an aerosol generation base material, and the temperature control method includes:

in a first stage i, controlling the heating element to increase the temperature from an initial temperature $T_0$ to a first temperature $T_1$;

in a second stage ii, controlling the heating element to decrease the temperature from the first temperature $T_1$ to a second temperature $T_2$; and in a third stage iii, controlling the heating element to perform constant temperature operation at the second temperature $T_2$, and if the detection element detects suction, controlling the heating element to increase the temperature to a third temperature $T_3$.

Further, the aerosol generation base material may generate aerosol in the three stages described above.

Wherein, the first temperature $T_1$, the second temperature $T_2$ and the third temperature $T_3$ may be set according to the heated aerosol generation base material, and are generally higher than the temperature at which the aerosol generation base material generates aerosol, and lower than the temperature at which the aerosol generation base material is burned.

Further, in order to achieve rapid preheating of the aerosol generation base material and shorten the response time of the aerosol generation apparatus to suction, the first temperature $T_1$ needs to be set to be higher, and may be 200-500° C., preferably 250-450° C., more preferably 300-450° C., most preferably 350-400° C.

Further, in order to promote sufficient release of aerosol in the aerosol generation base material and avoid waste, the third temperature $T_3$ may be 200-500° C., preferably 250-450° C., more preferably 300-450° C., most preferably 350-400° C.

Further, in order to ensure the consistency of aerosol release in the aerosol generation base material and avoid poor odor generation, the second temperature $T_2$ is preferably set to be 180-400° C., more preferably 200-350° C.

Further, the duration of the first stage i and the duration of the second stage ii are not particularly limited and can be set according to the specific aerosol generation base material, and the duration of the first stage i is the time when the heating element increases the temperature from the initial temperature $T_0$ to the first temperature $T_1$ (i.e. a time period from $t_0$ to $t_1$), and the duration of the first stage can be shortened as much as possible in order to quickly respond to suction. Preferably, the duration of the first stage is 5-20 seconds. The duration of the second stage ii is the time when the heating element decreases the temperature from the first temperature $T_1$ to the second temperature $T_2$ (i.e. a time period from $t_1$ to $t_2$), and preferably the duration of the second stage ii is 1-20 seconds.

Further, the total suction times is determined according to the amount of aerosol that can be generated by a specific aerosol generation base material, and the third stage iii is ended when a predetermined total number of suction times is detected.

Further, in order to avoid abnormal use, for example, after the heating element is controlled to start heating, in the event that the consumer does not perform suction, when a predetermined total number of suction times cannot be detected, the total duration of the third stage iii may be set according to the amount of aerosol that can be generated by a specific aerosol generation base material, if the predetermined total number of suction times is not detected but when the duration of the third stage iii reaches the set total duration of the third stage iii, the third stage iii is ended.

Preferably, the duration of the third stage iii is 30-120 seconds, and the predetermined total number of suction times is 5-30, more preferably 10-25.

Further, in one preferred embodiment of the invention, as shown in FIG. 1, the temperature control method includes:

in a first stage i, the heating element increases the temperature from an initial temperature $T_0$ to a first temperature $T_1$ within a duration of the first stage (i.e. within a time period from $t_0$ to $t_1$);

in a second stage ii, the heating element decreases the temperature from the first temperature $T_1$ to a second temperature $T_2$ within a duration of the second stage (i.e. within a time period from $t_1$ to $t_2$); and in a third stage iii, the heating element is controlled to perform constant temperature operation at the second temperature T2, and if the detection element detects suction within a first preset duration (i.e., within a time period from t2 to t3'), the heating element is controlled to increase the temperature from the second temperature T2 to a third temperature T3 within a time period from t3' to t3.

Figure 2:
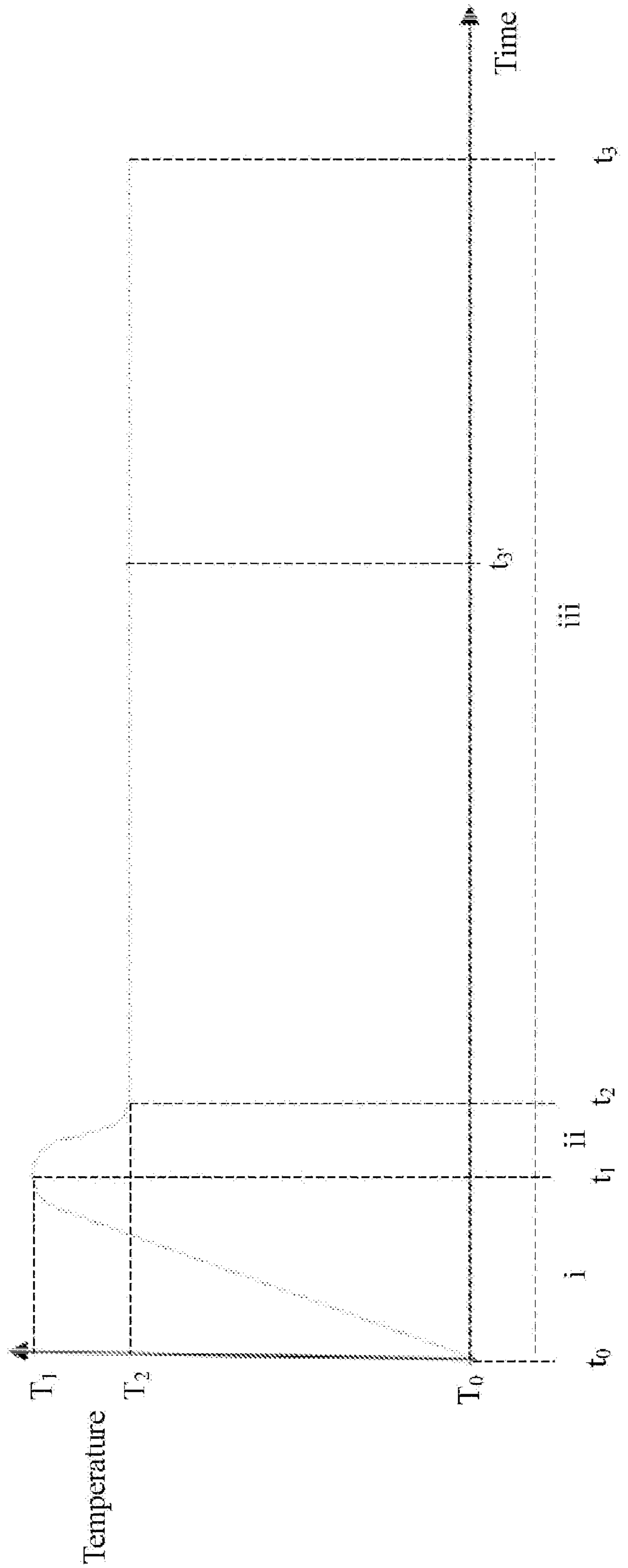
FIG. 2 is a temperature control curve of another preferred embodiment provided by the present invention.

In another preferred embodiment of the invention, as shown in FIG. 2, if the detection element does not detect suction within a first preset duration (i.e. within a time period from $t_2$ to $t_{3'}$), the heating element is controlled to operate continuously at the second temperature $T_2$ within a time period from $t_{3'}$ to $t_3$ until the end of the third stage iii.

Further, the first preset duration (t2 to t3') may be set as a duration from the start of the third stage to the time when the amount of aerosol generated by the aerosol generation base material at the second temperature begins to be insufficient. wherein, "the amount of aerosol begins to be insufficient" refers to the time when the amount of aerosol determined during smoking tasting of the aerosol generation base material by a smoking taster at the second temperature does not meet the suction requirement. In practice, because different consumers have different requirements for the amount of aerosol, a plurality of temperature control systems having different first preset durations may be arranged in a same aerosol generation apparatus according to the actual situation; or a series of aerosol generation apparatus having different first preset durations may be produced. Preferably, the first preset duration may be 20-90 seconds, more preferably 30-60 seconds.

Further, in the conventional temperature control methods of the heat-not-burn tobacco appliances, the heating curve is preset and does not change according to the suction frequency of consumers. In case the suction frequency of the consumers is higher, as the heating process progresses, aerosol in the aerosol generation base material around the heating element is completely released quickly, the aerosol generation base material far away from the heating element is not heated enough, the amount of aerosol released is low, the rate of aerosol release is slower, and the amount of aerosol generated from the aerosol generation base material as a whole in the later period gradually can not meet the needs of consumers. In contrast, if a consumer sucks less frequently, and the heating process still operates according to the preset temperature, and the amount of aerosol generated exceeds the needs of consumers, electric energy and the aerosol generation base material are wasted.

The present application provides a more intelligent heating curve by determining whether the temperature of the heating element is increased by whether the preset suction times is reached within a predetermined time.

In yet another preferred embodiment of the present application, the third stage iii is divided into a number of processes, a preset time, preset suction times, and a preset temperature are independently set in each process, in any one process, the heating element is controlled to perform constant temperature operation at a preset temperature of the process, and when the suction times of the process is detected to reach the preset suction times within a preset time of the process, the process is ended, the temperature is increased, and a next process is entered.

Figure 3:
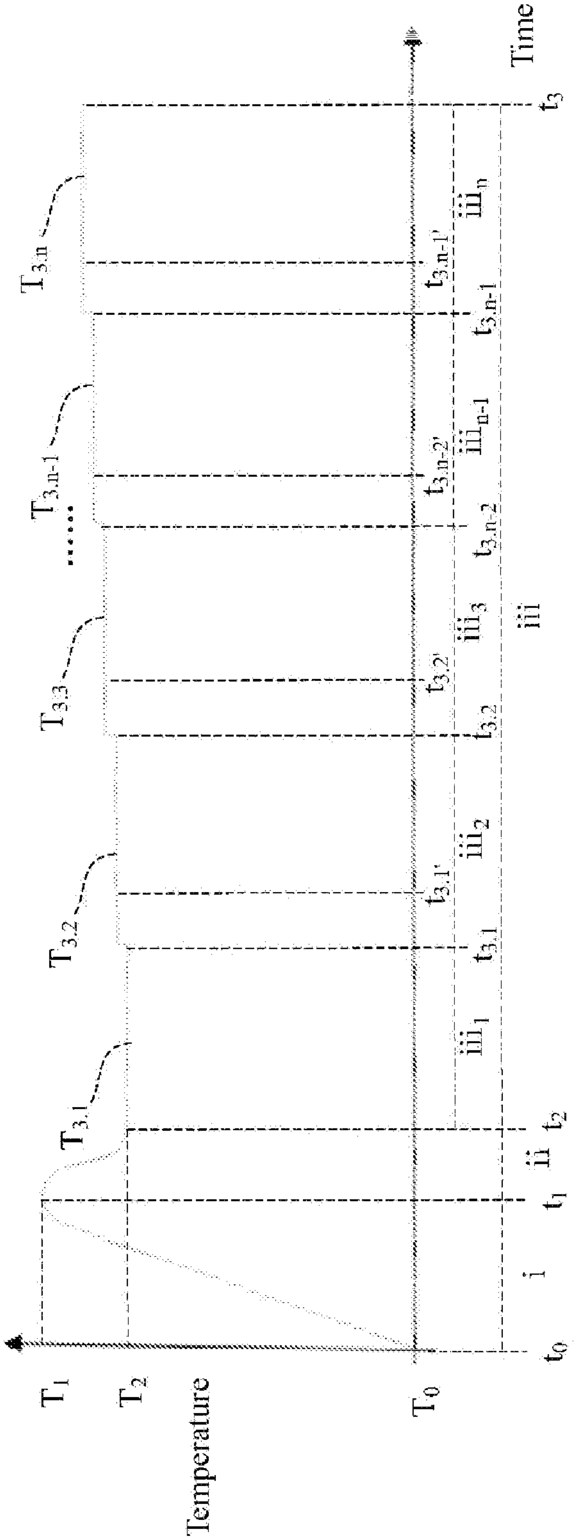
FIG. 3 is a temperature control curve of yet another preferred embodiment provided by the present invention.

Specifically, as shown in FIG. 3, in a first stage i, the heating element increases the temperature from an initial temperature $T_0$ to a first temperature $T_1$ within a duration of the first stage (i.e. within a time period from $t_0$ to $t_1$);

in a second stage ii, the heating element decreases the temperature from the first temperature $T_1$ to a second temperature $T_2$ within a duration of the second stage (i.e. within a time period from $t_1$ to $t_2$); and in a third stage iii, n processes are included, in a first process iii1, the heating element is controlled to perform constant temperature operation at a second temperature T2 (also a preset temperature T3.1 of the first process iii1), if the preset suction times of the first process (a time point at which the preset suction times of the first process is detected is t3.1) is detected within a preset duration of the first process (i.e. within a time period from t2 to t3.1'), the first process iii1 is immediately ended, the duration of the first process iii1 being a time period from t2 to t3.1 and the temperature is subsequently increased to a preset temperature T3.2 of a second process, and the second process iii2 is entered;

in the second process $iii_2$, the heating element is controlled to perform constant temperature operation at the preset temperature $T_{3.2}$ of the second process, if the preset suction times of the second process (a time point at which the preset suction times of the second process is detected is $t_{3.2}$) is detected within a preset duration of the second process (i.e. within a time period from $t_{3.1}$ to $t_{3.2}$), the second process $iii_2$ is immediately ended, the duration of the second process $iii_2$ being a time period from $t_{3.1}$ to $t_{3.2}$ and the temperature is subsequently increased to a preset temperature $T_{3.3}$ of a third process $iii_3$, and the third process $iii_3$ is entered;

in an n−1-th process the heating element is controlled to perform constant temperature operation at a preset temperature $T_3$ of the n−1-th process $iii_{n-1}$, if the preset suction times of the n−1-th process (a time point at which the preset suction times of the n−1-th process is detected is $t_{3.n-1}$) is detected within a preset duration of the n−1-th process (i.e. a time period from $t_{3.n-2}$ to $t_{3.n-1'}$), the n−1-th process $iii_{n-1}$ is immediately ended, the duration of the n−1-th process being a time period from $t_{3.n-2}$ to $t_{3.n-1}$, and the temperature is subsequently increased to a preset temperature $T_{3.n}$ of a nth process $iii_n$, and the nth process $iii_n$ is entered; and in the nth process $iii_n$, the heating element is controlled to perform constant temperature operation at a preset temperature $T_{3.n}$ of the nth process bin, a predetermined total number of suction times is detected, and the third stage iii is ended.

Further, the preset duration and the preset suction times in each process may be the same or different, and may be set according to the specific aerosol release situation of the aerosol generation base material, the preset suction times is preferably 1-10, more preferably 2-5, and the preset duration is preferably 3-30 seconds, more preferably 5-20 seconds. Further, in the third stage, with the increase of suction time, aerosol in the aerosol generation base material around the heating element is completely released, the aerosol generation base material farther away from the heating element is not heated enough, the amount of aerosol released is low and the rate of aerosol release is slow, and in order to ensure that the amount of aerosol per suction meets the requirements, the preset suction times in the later process shall be less than or equal to the preset suction times in the previous process.

Further, in order to ensure consistency of aerosol release in the aerosol generation base material, the difference between the preset temperatures of the two adjacent processes is less than or equal to 15° C.

Further, in yet another preferred embodiment of the present invention, in any one of the aforementioned processes, if the detected suction times is less than the preset suction times of the process within a preset duration of the process, the heating element is controlled to perform constant temperature operation at a preset temperature of the process until the end of the third stage.

Figure 4:
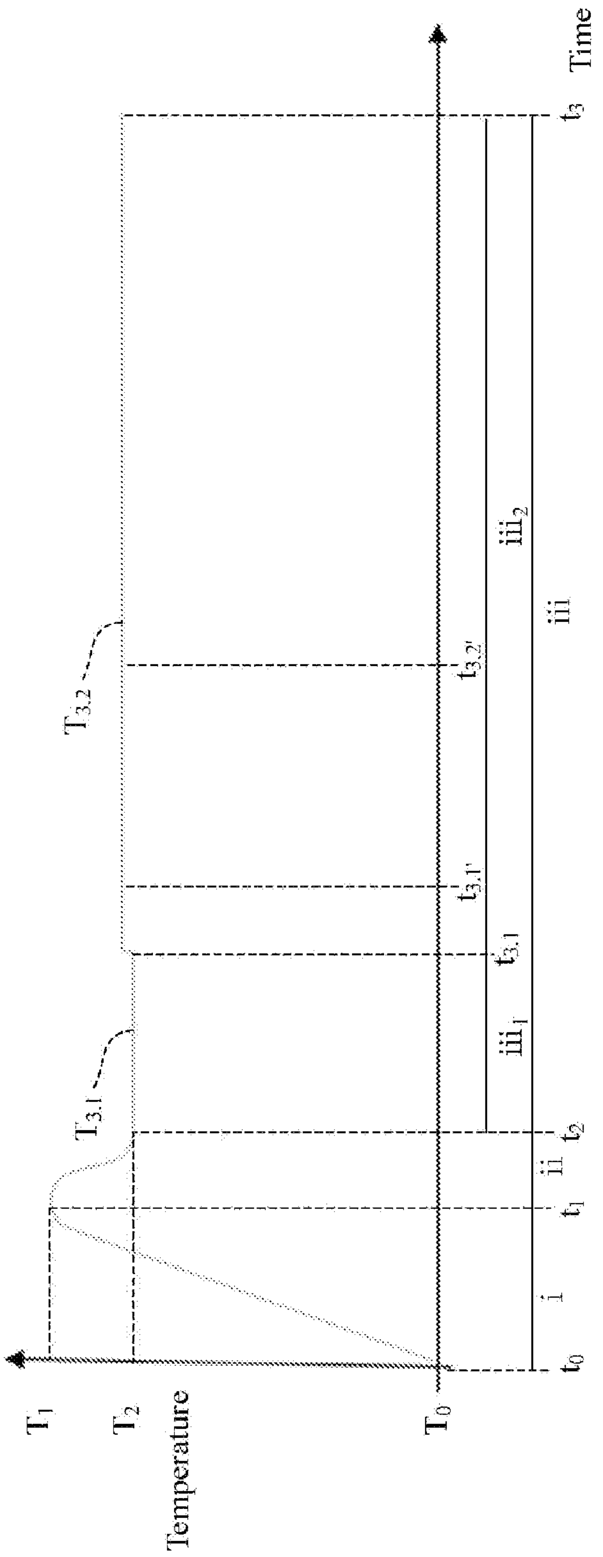
FIG. 4 is a temperature control curve of yet another preferred embodiment provided by the present invention.

For example, as shown in FIG. 4, in a third stage iii, in a first process $iii_1$, the heating element is controlled to perform constant temperature operation at a second temperature $T_2$, if the preset suction times of the first process is detected within a preset duration of the first process $iii_1$ (i.e. within a time period from $t_2$ to $t_{3.1'}$), the first process $iii_1$ is immediately ended, the duration of the first process $iii_1$ being within a time period from $t_2$ to $t_{3.1}$ and the temperature is subsequently increased to a preset temperature $T_{3.2}$ of a second process $iii_2$, and the second process $iii_2$ is entered;

in the second process $iii_2$, the heating element is controlled to perform constant temperature operation at a preset temperature $T_{3.2}$ of the second process $iii_2$, and if the preset suction times of the second process is not detected within a preset duration of the second process $iii_2$ (i.e. within a time period from $t_{3.1}$ to $t_{3.2'}$), the heating element is controlled to perform constant temperature operation at a preset temperature $T_2$ of the second process $iii_2$ until the end of the third stage iii. At this time, the third stage includes only two processes.

In connection with the above two preferred embodiments, it can be understood that in the aforementioned "third stage, including n processes", n is greater than or equal to 1, and the upper limit of n is not particularly defined and is determined by the number of actual processes undergone to reach the predetermined total number of suction times.

With the above described technical solution, in the third stage, the temperature of the heating element is controlled to rise gradually according to the suction frequency, and when the suction frequency is higher, the temperature of the heating element rises rapidly and the amount of aerosol generated remains at a higher level; when the suction frequency is low, the temperature of the heating element does not rise or rises slowly, the aerosol generated remains at a low level, thereby avoiding waste.

In this application, the change of temperature curve is controlled by the suction of the consumer, which can not only ensure that the amount of aerosol generated by the aerosol generation base material during continuous suction can meet the needs of consumers, but also save electric energy and avoid waste of the aerosol generation base material when the suction frequency of consumers is low.

Further, the present invention also provides an aerosol generation apparatus, including a control element, a detection element and a heating element for heating an aerosol generation base material, wherein the control element is configured to control the energy supply of the heating element and realize any one of the foregoing temperature control methods.

Further, the detection element may be any detection element that detects a suction action existing in the prior art, and may be, for example, a temperature detection element and is configured to detect the temperature of the heating element, and determine whether a suction action occurs through the temperature change of the heating element, wherein it is determined that the suction action occurs when the temperature detection element detects a sudden significant decrease in the temperature of the heating element.

Optionally, the detection element may also be an air flow detection element, and is configured to determine whether a suction action occurs through the air flow.

Further, the present invention also provides an aerosol generation system, including the aforementioned aerosol generation apparatus and an aerosol generation base material.

The temperature change of the heating element is controlled in accordance with the suction action of the consumer in the present invention. In the third stage, the heating element increases the temperature only when suction is detected, thereby ensuring that the supply of an aerosol always meets the requirement when the consumer sucks, and avoiding waste of electric energy and the aerosol generation base material. A more intelligent temperature control method is provided, and the suction experience of the consumer is improved.

Although the invention has been illustrated and described by referring to some preferred embodiments of the invention, those of ordinary skill in the art should understand that the above contents are a further detailed description of the invention in combination with specific embodiments, and it cannot be determined that the specific implementation of the invention is limited to these descriptions. Those skilled in the art can make various changes in form and detail, including making some simple deduction or replacement, without departing from the spirit and scope of the invention.

The invention claimed is:

1. A temperature control method for an aerosol generation apparatus, wherein the aerosol generation apparatus comprises a detection element and a heating element for heating an aerosol generation base material, and the temperature control method comprises:

in a first stage, controlling the heating element to increase a temperature of the aerosol generation base material from an initial temperature to a first temperature;

in a second stage, controlling the heating element to decrease the temperature from the first temperature to a second temperature; and in a third stage, controlling the heating element to provide a constant temperature operation at the second temperature, and during an instance where the detection element detects suction, controlling the heating element to increase the temperature to a third temperature;

wherein, during the third stage, detection of the suction by the detection element occurs within a first preset duration, the heating element is controlled to maintain the second temperature as constant for the first preset duration and, thereafter, the heating element is controlled to increase the temperature to the third temperature; and wherein, in an absence of the detection element detecting the suction within the first preset duration, the heating element is controlled to operate continuously at the second temperature until termination of the third stage.

2. The temperature control method according to claim 1, wherein the first preset duration is equal to a duration from a start of the third stage to a time when an amount of aerosol generated by the aerosol generation base material at the second temperature decreases below a predetermined threshold.

3. The temperature control method according to claim 1, wherein the third stage is ended when a predetermined total number of suction times is detected.

4. The temperature control method according to claim 1, wherein the first temperature, the second temperature and the third temperature are higher than a temperature at which the aerosol generation base material generates aerosol, and lower than a temperature at which the aerosol generation base material is burned.

5. The temperature control method according to claim 1, wherein the first temperature and/or the third temperature is 200-500° C. and/or the second temperature is 180-350° C.

6. An aerosol generation apparatus comprising a control element, a detection element and a heating element for heating an aerosol generation base material, wherein the control element is configured to control an energy supply to the heating element and realize the temperature control method according to claim 1.

7. The aerosol generation apparatus according to claim 6, wherein the detection element is a temperature detection element, and is configured to detect a temperature of the heating element and determine whether a suction action occurs through a temperature change of the heating element;

or the detection element is an air flow detection element, and is configured to determine whether a suction action occurs through air flow.

8. An aerosol generation system comprising the aerosol generation apparatus according to claim 6, and an aerosol generation base material.

9. An aerosol generation system comprising the aerosol generation apparatus according to claim 7, and an aerosol generation base material.

10. A temperature control method for an aerosol generation apparatus, wherein the aerosol generation apparatus comprises a detection element and a heating element for heating an aerosol generation base material, and the temperature control method comprises:

in a first stage, controlling the heating element to increase a temperature of the aerosol generation base material from an initial temperature to a first temperature;

in a second stage, controlling the heating element to decrease the temperature from the first temperature to a second temperature; and in a third stage, controlling the heating element to provide a constant temperature operation at the second temperature, and during an instance where the detection element detects suction, controlling the heating element to increase the temperature to a third temperature;

wherein, the third stage is divided into a number of processes, a preset duration, preset suction times, and a preset temperature are independently set in each process, wherein in any one process, the heating element is controlled to perform constant temperature operation at a preset temperature of the process, and when the preset suction times of the process is detected within a preset duration of the process, the process is ended, the temperature is increased, and a next process is entered, and wherein in the third stage, in any one process, in an instance where detected suction times is less than the preset suction times of the process within the preset duration of the process, the heating element is controlled to perform constant temperature operation at the preset temperature of the process until termination of the third stage.

11. The temperature control method according to claim 10, wherein, in the third stage, a difference between the preset temperatures of two adjacent processes is less than or equal to 15° C.

12. The temperature control method according to claim 10, wherein, in the third stage, the preset suction times in a later process is less than or equal to the preset suction times in a previous process.

13. The temperature control method according to claim 10, wherein the third stage is ended when a predetermined total number of suction times is detected.

14. The temperature control method according to claim 10, wherein the first temperature, the second temperature and the third temperature are higher than a temperature at which the aerosol generation base material generates aerosol, and lower than a temperature at which the aerosol generation base material is burned.

15. The temperature control method according to claim 10, wherein the first temperature and/or the third temperature is 200-500° C. and/or the second temperature is 180-350° C.

* * * * *